United States Patent [19]

McClure

[11] 4,156,998
[45] Jun. 5, 1979

[54] EQUIPMENT SHELTER

[76] Inventor: James B. McClure, 7810 NW. Scenic Dr., Kansas City, Mo. 64152

[21] Appl. No.: 749,923

[22] Filed: Dec. 13, 1976

[51] Int. Cl.² .............................................. E04C 2/10
[52] U.S. Cl. .................................... 52/309.5; 174/50
[58] Field of Search .............. 220/4 E, 4 B; 174/50, 174/37, 38; 52/309.9, 79.9, 506, 309.11, 79.1, 309.5, 261

[56] References Cited

U.S. PATENT DOCUMENTS

| | | | |
|---|---|---|---|
| 2,896,271 | 7/1959 | Kloote | 52/309.9 |
| 3,148,380 | 9/1964 | Hanson | 52/79.7 |
| 3,175,940 | 3/1965 | Talmey | 52/309.9 |
| 3,226,899 | 1/1966 | Blickle | 52/506 |
| 3,367,076 | 2/1968 | O'Brien | 52/309.11 |
| 3,481,642 | 12/1969 | Bonallack | 52/309.9 |
| 3,583,118 | 6/1971 | Lowery | 52/309.11 |
| 3,760,548 | 9/1973 | Sauer | 52/309.11 |
| 3,778,528 | 12/1973 | Heifetz | 52/79.1 |
| 3,932,976 | 1/1976 | Steel | 52/309.9 |
| 3,944,718 | 3/1976 | Bright | 220/18 |

FOREIGN PATENT DOCUMENTS 1804341  5/1970  Fed. Rep. of Germany ............ 52/79.1

*Primary Examiner*—John E. Murtagh
*Attorney, Agent, or Firm*—Fishburn, Gold & Litman

[57] ABSTRACT

An equipment shelter is disclosed for housing delicate apparatus such as electronic equipment, and which reliably protects the same not only against physical damage, but also against corrosive or thermal damage as might result from excessive exposure to the weather or other hostile environmental conditions.

12 Claims, 9 Drawing Figures

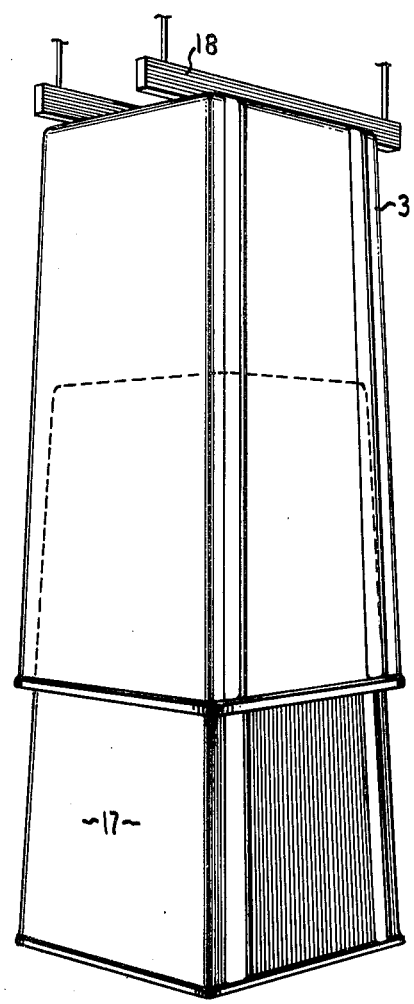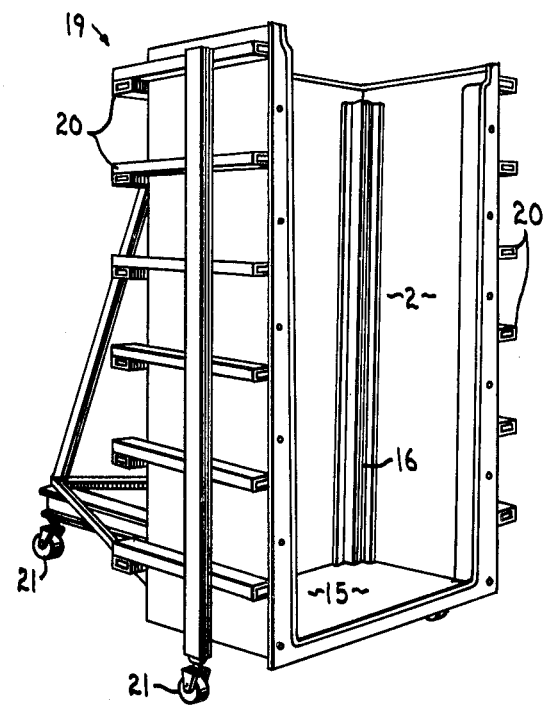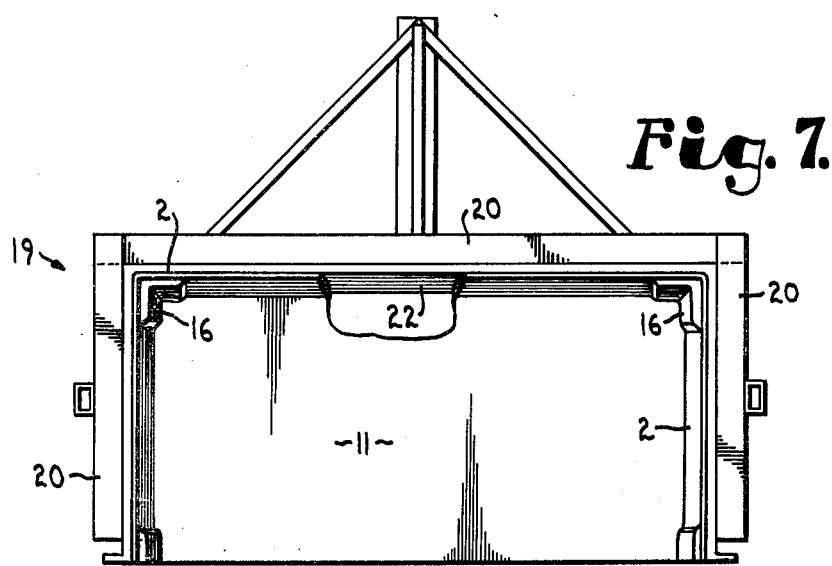

EQUIPMENT SHELTER

BACKGROUND OF THE INVENTION

The present invention pertains to enclosures for delicate apparatus such as electronic equipment, sensitive measuring and/or recording devices, process control apparatus, electrical switching equipment or relays, and the like. More particularly, the present invention pertains to an enclosure that is durable, flexible and impervious, and which is thus highly reliable in protecting such apparatus against damage by being struck with solid objects, by contact with harmful liquids, gases or vapors, or by fire.

It is known that delicate apparatus of the aforementioned types should be adequately protected from physical and chemical damage, and prior enclosures for the purpose have comprised inner and outer plastic shells in spaced relation to each other and with a polymeric foam layer therebetween. In accordance with one known method, such enclosures have been produced by prefabricating the inner and outer shells from fiberglass reinforced polyester resin, followed by insertion of the inner shell into the outer shell and injection of a polymeric foam into the space between the two shells. In this method, the forming of the outer shell can present problems since it is necessary that a person work within the mold for laying up the fiberglass laminate. The laying up is usually done with the mold upside down so that the person is standing in a depression, and the quarters are not only cramped and difficult to work in, but often dangerous because it is difficult to provide good ventilation in such small spaces, and to provide access for quick escape of the person in case of an emergency.

SUMMARY OF THE INVENTION

It is therefore an object of the present invention to provide a durable and flexible equipment shelter having an inner and outer shell with a layer of polymeric foam therebetween, and wherein the outer shell of the shelter is formed from two halves joined along a common line.

Another object is to provide an equipment shelter having an inner shell, an outer shell formed from two halves joined along a common line, a layer of polymeric foam between the inner and outer shells, and wherein the foam layer is bonded to the inner shell and the two halves of the outer shell and are thus integrally united.

Yet another object is to provide an equipment shelter in accordance with the previously stated objects, and wherein the inner and outer shells are fabricated from an impermiable polymeric material, and any access openings through the shells are sealable from the outside atmosphere.

Still another object is to provide an improved method for fabricating an equipment shelter comprising inner and outer shells and a layer of polymeric foam between the shells.

Other objects and advantages of the invention will become apparent from the following description, the drawings, and the appended claims.

The present invention is an equipment shelter comprising an outer shell formed from two halves that are joined along a common line, an inner shell located within the outer shell and spaced inwardly in relation thereto, and a polymeric foam layer that extends between the inner and outer shells.

The present equipment shelter is thus produced by joining two shell halves along a common edge portion to form an outer shell, emplacing an inner shell within the outer shell and emplacing a polymeric foam layer between the two shells.

In preferred embodiments, the shells are formed from fiberglass reinforced polyester resin and a polyurethane foam is injected between the shells, and the foam bonds to each shell and thereafter solidifies to provide an integral unitary structure which is very sturdy but nonetheless flexible to a degree which enhances its durability.

BRIEF DESCRIPTION OF THE DRAWINGS

FIG. 5 is a perspective elevational view of an inner shell for the shelter of FIG. 1, and further illustrates removal of the inner shell from a mold therefor.

FIG. 6 is a perspective elevational view of a mold for one of the outer shell halves, and shows the mold with an unremoved shell half therein.

FIG. 7 is a downward view of the mold and shell half shown in FIG. 6.

DESCRIPTION OF PREFERRED AND ALTERNATIVE EMBODIMENTS

Figure 1:
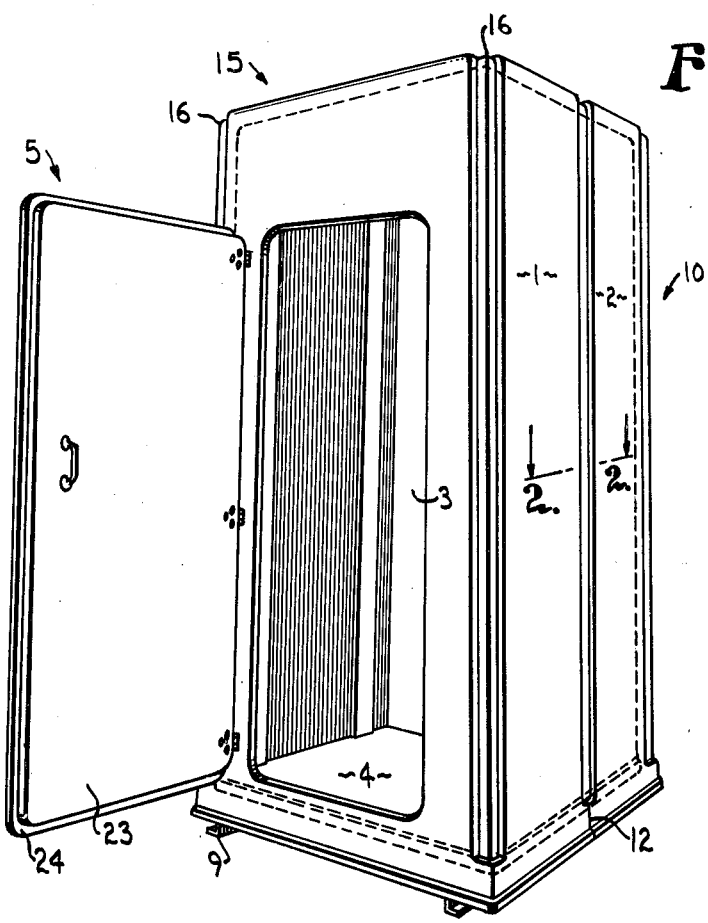
FIG. 1 is a perspective elevational view of an equipment shelter constructed in accordance with the present invention.
Figure 3:
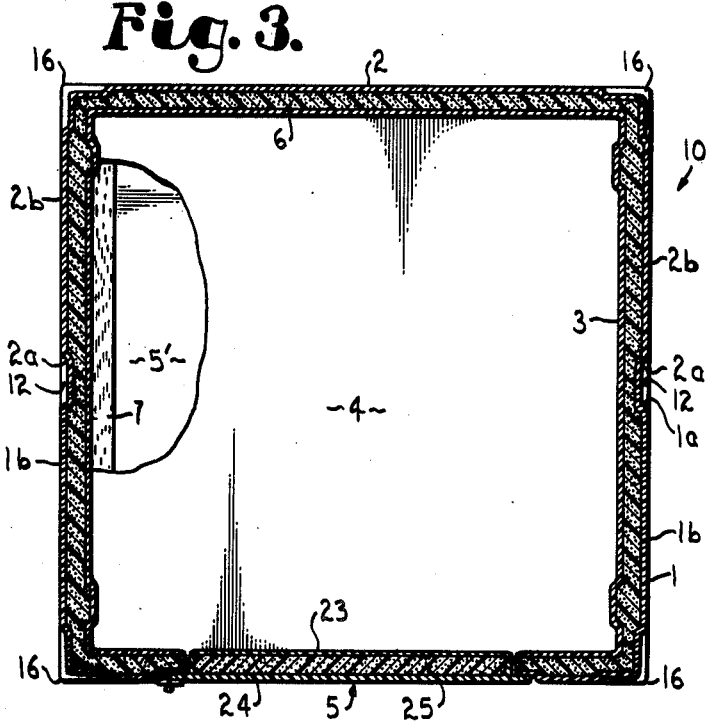
FIG. 3 is a downwardly observed sectional view of the equipment shelter shown in FIG. 1.

In FIG. 1, the equipment shelter shown therein comprises an outer shell 10 which is made up from first and second shell halves represented at 1 and 2 respectively, an inner shell 3, an upper floor 4, and a hinge mounted access door 5. In FIG. 3, a polymeric foam layer 6 resides between the inner and outer shells, and the shelter further comprises a lower floor 5' below the upper floor 4. A support 7 for the upper floor is attached to the inner shell whereas a support 8 for the lower floor is attached to the outer shell 10. Channel iron members 9 are attached to support members 8, and are useful in skidding the shelter from one location to another and for stationarily positioning to a floor or concrete pad.

As was previously indicated, both the inner and the outer shells can be molded from any suitable polymeric resin, but preferred embodiments of the present shelter comprises reinforced shells fabricated by manually laying up or spraying the resin and a reinforcing material in or on a mold, e.g., fiberglass reinforced polyester resin. Additionally, the polymeric foam layer and its method of emplacement between the shell can be of any suitable type, but it is preferred that the foam layer can be emplaced by injecting the polymer between the shells as froth made up by entrainment of a nonreactive within a liquified polymer, and whereafter the froth solidifies to form resilient or rigid foam, and preferably the latter.

The polymer of the foam is a variety which will bond to the inner and outer shells when it solidifies, whereby both shells and the foam become integrally interconnected to provide a unitary structure.

Figure 2:
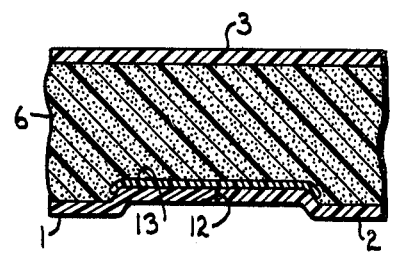
FIG. 2 is a fragmented, somewhat enlarged sectional view of the wall of the equipment shelter along line 2—2 in FIG. 1.

Once the two outer shell halves have been fabricated, they are then joined along a common line which is represented at 12 in the drawings. To advantage, each shell half can be provided in the molding stage with an indented portion 1a and 2a which resides adjacent the common line 12, whereby the joint between the halves along line 12 is recessed below unindented portions 1b and 2b of the two halves. Such recessing, though not necessary, makes the joint less visible and improves the overall appearance of the shelter, and also provides stronger construction by a locking cooperation with the foam. The joint along line 12 can be sealed from the inside prior to emplacement of the foam by spraying or laying a strip 13, FIG. 2, such as fiberglass reinforced polyester, along the line 12 prior to introducing the foam, or, in the alternative, the strip 13 can be omitted, since the bonding and sealing of the foam to the shell surface will produce a sturdy, leak free joint, FIG. 3. In the latter case the shell halves are tightly and closely abutted along line 12 before the foam is introduced.

Although equipment shelters of the present invention can be fabricated to any suitable size and configuration, a preferred configuration is as shown in FIG. 1 wherein the outer shell has four sides, a roof 15, and intended corners 16. Such configuration is not only esthetically pleasing and strong, but is also practical from the standpoint of providing openings therein for access by a worker, utility service connections, venting, and the like. The indented corners are also functional in that stiffening is thereby provided to protect against impact damage, or failure as a result of flexing the sides during handling, shipment, installation or use.

The inside of the inner shell and the outside of the outer shell can be provided with any suitable type of pleasing and durable finish, and when the shells are made of fiberglass reinforced polyester resin, a molded-in polyester gel coat finish can be applied to both shells. Preferably, the gel coat finish will comprise an ultraviolet ray screening material, and can further include any suitable coloring pigment.

Fabrication of the inner shell, the outer shell halves, and the unitary shelter assembly, as depicted in FIGS. 5-9, will be further described with specific but nonlimiting references to use of fiberglass reinforced polyester resin as a material of construction for the shells. In FIG. 5, a gel coat of polyester resin is first applied to a mold 17 for the inner shell 3. Thereafter, fiberglass and polyester resin are applied by hand, or preferably, sprayed as a mixture which is catalyzed at the spray gun, to the precoated mold to form the inner shell. The applied mixture is rolled smooth and after it has set, the inner shell is separated from the mold with a vertical lifting and lowering means represented at 18.

Construction of the two halves of the outer shell is accomplished in a somewhat similar fashion, except two outer molds 19 and 19a are used, and which are disposed upside down with respect to mold 17 shown in FIG. 5. Accordingly, each of the outer molds has an inner cavity and an open side which leads into the cavity, thus permitting a worker to manually, or by said spraying, lay up and roll smooth fiberglass reinforced resin on the inside surface 22 of the mold by hand. It should be noted from FIG. 6 that the worker is relatively unencumbered when laying up the fiberglass and resin in the mold cavity and does not have to work within the confined and restricted space that exists within a single, four sided mold. Convenience, safety and comfort of the worker are thereby greatly improved.

Figure 8:
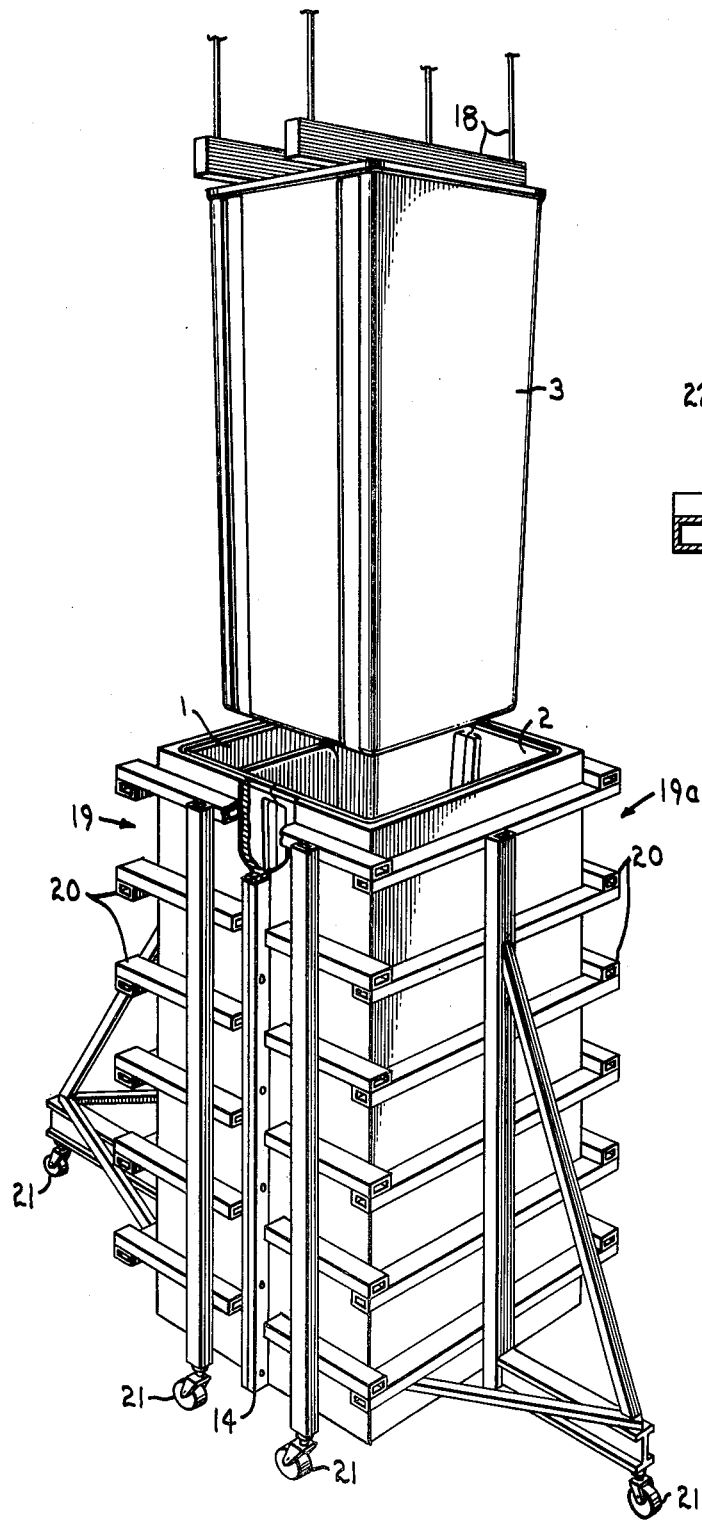
FIG. 8 is a perspective elevational view of two abutted and aligned molds, each having an outer shell half therein and viewed just prior to emplacement of an inner shell within the outer shell.

It should also be noted that each of the molds 19 and 19a include heavy external reinforcement members 20 and rollers 21. By means of the rollers, the two molds are confrontingly abutted as shown in FIG. 8, secured together by both receiving lips 14, and the reinforcement members 20 will sufficiently stiffen the molds to prevent outward distortion thereof during emplacement, expanding and curving of the polymeric foam layer between the shells. When needed, jacking means (not shown) can be used as aids in aligning the molds for mating the edges of the two shell halves along common line 12.

In forming the shell halves, a gel coat polyester is first applied to the inside surface 22 of the molds 19 and 19a, and a worker then lays up and smooths fiberglass reinforced polyester resin in the mold to form a laminated shell half in both molds. Once the resin of the shell halves has cured, the molds are confrontingly abutted with the shell halves still in place as shown in FIG. 8. After assuring that the joint edges of each outer shell are properly aligned, the joint along common line 12 can be sealed from the inside as previously described. Subsequently, the inner shell can be inserted into the outer shell as depicted in FIG. 8. More specifically, the inner shell is first inverted, a foaming jig is placed therein, and the foaming jig-inner shell assembly is raised and then lowered into the outer shell. The function of the foaming jig is to prevent inward deformation of the inner shell during emplacement of the foam layer. The foaming jig should have an outer shape which matches the inner shape of the inner shell, and a sufficiently rigid mold for the outer shell can be used for this purpose when such is desired.

Figure 9:
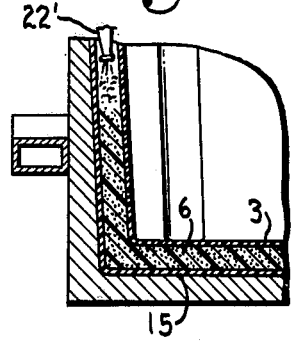
FIG. 9 represents injection of a polymeric foam into the space between the inner and outer shells following emplacement and positioning of the inner shell within the outer shell formed by abutment of the two outer shell halves.

After assuring that the inner shell is properly positioned in spaced relation within the outer shell, polymeric foam can be emplaced as represented in FIG. 9. By use of a nozzle 22', a mixture of liquid polymer and a nonreactive gas is injected into the space between the shells to form a froth which subsequently solidifies. A preferred polymer is polyurethane which solidifies into a rigid foam and adhesively bonds to the shells when it solidifies.

Openings in the shells for doorways, vents, service entries, windows, etc. can be formed during the molding operation or formed subsequently by drilling or sawing. As can be seen in FIGS. 1 and 3, the door 5 comprises inner and outer plates 23 and 24, respectively, with a foam layer 25 between the two plates. Accordingly, the inner and outer plates 23 and 24, respectively, with a foam layer 25 between the two plates. Accordingly, the inner and outer door plates can be fabricated from fiberglass reinforced polyester resin and the polymeric foam layer can be polyurethane. To advantage, the door 5 can further include a gasket and latching means (not shown) whereby a sealing closure is established and maintained upon closing the door.

Figure 4:
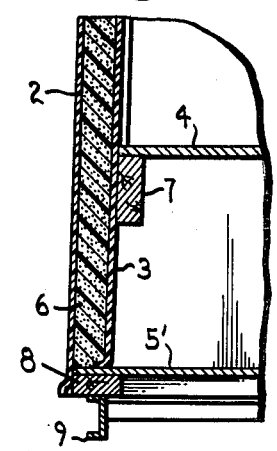
FIG. 4 is a fragmented sectional view, in elevation, of a lower corner of the shelter of FIG. 1.

To provide means for attaching screw fasteners to the inside of the shelter for securing apparatus therein, wood blocking (not shown) can be "fiberglassed" to the inside of the inner shell. FIG. 4 shows a shelter having two floors to provide two compartments therein, and the upper floor 4 can include a removable panel to permit access to the compartment betweem the two floors. Where preferred, only one floor can be used, and the joint between the lowermost floor and the walls of the shelter can be sealed by means of a suitable sealant compound or caulk. Plywood is a satisfactory flooring material and can be covered with a fiberglass-polyester resin laminate, vinyl flooring material, etc. A sandwich panel floor having a thick, wooden upper face, a wood or cement asbestos board lower face, and a foam core between the two faces can also be used.

An exemplary shelter constructed in accordance with the present invention will have a height of about six to eight feet, a width and depth of about four feet, and a wall and thickness of about 2¼ inches. When constructed of fiberglass reinforced resin and polyurethane foam as previously described, the walls of a typical structure can withstand winds to 150 MPH and roof loads to 90 pounds per square foot, and the heat transmission, U-factor, of the roof and walls can be on the order of 0.061 BTU/hour/square foot. Because of the low thermal conductivity of the walls and roof of the structure, it enhances protection of the enclosed equipment against fires of an external origin, and is especially adapted to air conditioning in the event the enclosed equipment is sensitive to excessive heat or temperature variation. In addition, the polymeric constituent of the shells and the foam layer therebetween can be fire retarded as further protection against fire.

An equipment shelter that fulfills the previously stated objects has now been described in detail, and even though the present shelter has been described with reference to specific embodiments thereof, it will nonetheless be understood that even other embodiments will become apparent which are within the spirit and scope of the invention defined in the following claims.

What is claimed and desired to secure by Letters Patent is:

1. An equipment shelter having:
   a. an outer shell with surrounding side walls and a roof and an inner shell with surrounding side walls and a roof corresponding to said outer shell surrounding side walls and roof,
   b. said outer shell having a mold finished outer surface and a laid-up inner surface and comprising at least two polymeric sections each having an integral roof portion, said polymeric sections being joined along a common line extending upwardly along at least one of said outer shell side walls and along said outer shell roof;
   c. said inner shell being located within said outer shell and having a laid-up outer surface spaced inwardly in relation to said outer shell and
   d. a polymeric foam layer extending between said respective outer shell and said inner shell surrounding side walls and roofs,
   e. said foam layer extending unbroken across said common line thereby securing said outer shell sections together while integrating said outer shell and said inner shell.

2. An equipment shelter as in claim 1 wherein said shells are fabricated from a fiberglass reinforced polyester resin.

3. An equipment shelter as in claim 2 wherein at least one of said shells comprises a molded-in gel coat finish.

4. An equipment shelter as in claim 3 wherein said finish comprises an ultraviolet ray screening material.

5. An equipment shelter as in claim 3 wherein said finish is a pigmented polyester resin.

6. An equipment shelter as in claim 1 wherein said polymeric foam layer is a polyurethane foam.

7. An equipment shelter as in claim 1 wherein said sections of the outer shell are indented adjacent said common line, and the joint between the sections is recessed below unindented portions of the shell.

8. An equipment shelter as in claim 1 wherein the joint between the two sections is sealed.

9. An equipment shelter as in claim 8 wherein said joint is sealed with a fiberglass reinforced polyester resin applied to the joint from inside said outer shell.

10. An equipment shelter as in claim 1 and further comprising a floor located above the lower elevational limits of said outer shell.

11. An equipment shelter as in claim 10 and including a second floor located below the aforesaid floor.

12. An equipment shelter as in claim 1 wherein said outer shell has four sides, a roof, and corners that are indented.

* * * * *